US009171345B2

(12) United States Patent
Rieppi

(10) Patent No.: US 9,171,345 B2
(45) Date of Patent: Oct. 27, 2015

(54) SYSTEM AND METHOD FOR TERMINAL CAPACITY MANAGEMENT

(71) Applicant: Stefano Rieppi, Atlanta, GA (US)

(72) Inventor: Stefano Rieppi, Atlanta, GA (US)

(73) Assignee: Norfolk Southern Corporation, Norfolk, VA (US)

( * ) Notice: Subject to any disclaimer, the term of this patent is extended or adjusted under 35 U.S.C. 154(b) by 118 days.

(21) Appl. No.: 13/768,369

(22) Filed: Feb. 15, 2013

(65) Prior Publication Data

US 2014/0236957 A1 Aug. 21, 2014

(51) Int. Cl.
| G06F 17/30 | (2006.01) |
| G06Q 50/30 | (2012.01) |
| G06Q 10/04 | (2012.01) |
| G06Q 10/06 | (2012.01) |

(52) U.S. Cl.
CPC .............. *G06Q 50/30* (2013.01); *G06Q 10/04* (2013.01); *G06Q 10/063* (2013.01)

(58) Field of Classification Search
USPC ......... 707/741, 756; 705/5, 6, 7, 8; 701/1, 19, 701/20, 408, 468; 703/2
See application file for complete search history.

(56) References Cited

U.S. PATENT DOCUMENTS

| 6,961,682 | B2* | 11/2005 | Doner ................................. 703/2 |
| 7,725,252 | B2* | 5/2010 | Heddebaut et al. ............ 701/408 |
| 2002/0082893 | A1* | 6/2002 | Barts et al. .......................... 705/8 |
| 2003/0105561 | A1* | 6/2003 | Nickles et al. ................... 701/19 |
| 2004/0010432 | A1* | 1/2004 | Matheson et al. ................. 705/7 |
| 2004/0088392 | A1* | 5/2004 | Barrett et al. ................. 709/223 |
| 2004/0093245 | A1* | 5/2004 | Matheson et al. ................ 705/7 |
| 2006/0074544 | A1* | 4/2006 | Morariu et al. ................ 701/117 |
| 2008/0129546 | A1* | 6/2008 | Manor .......................... 340/936 |
| 2008/0167767 | A1* | 7/2008 | Brooks et al. .................... 701/20 |
| 2008/0195257 | A1* | 8/2008 | Rauch ................................ 701/1 |
| 2008/0195428 | A1* | 8/2008 | O'Sullivan ........................ 705/6 |
| 2010/0087972 | A1* | 4/2010 | Muinonen et al. .............. 701/19 |
| 2010/0250481 | A1* | 9/2010 | Tomastik ......................... 706/52 |
| 2011/0231419 | A1* | 9/2011 | Papke et al. .................... 707/756 |
| 2014/0012438 | A1* | 1/2014 | Shoppa et al. ................... 701/19 |
| 2014/0012498 | A1* | 1/2014 | Gustafson et al. ............. 701/468 |
| 2014/0089032 | A1* | 3/2014 | Bell ............................. 705/7.24 |
| 2014/0117169 | A1* | 5/2014 | Itagaki et al. ............... 246/34 R |
| 2014/0142996 | A1* | 5/2014 | Skyer et al. ....................... 705/5 |

\* cited by examiner

*Primary Examiner* — Mariela Reyes
*Assistant Examiner* — Thong Vu
(74) *Attorney, Agent, or Firm* — Goodwin Procter LLP

(57) ABSTRACT

A system and method for determining rail terminal capacity needs. In one embodiment, terminal railcar inventory is determined periodically throughout a specific time interval based on terminal traffic data. Train traffic data is accessed and indexed into discrete time periods, such as daily and hourly intervals. Dwell occupancy indexes are created with periodic intervals, and assigned dwell occupancy values based on said dwell occupancy definitions and traffic data. The railcar inventory of the train terminal at any particular time may then be determined by cross-tabulating the occupancy dwell values, and applying business rules. The number and size of tracks needed to accommodate a rail terminal may be determined by assigning blocks of railcars to terminal tracks. Using the railcar inventory, a list of railcar blocks, railcar block sizes, railcar block classifications, and track classifications is created. After specifying switch parameters, the list of railcar blocks is evaluated based on the list of railcar block sizes and the list of railcar block classifications. The list of railcar blocks is then assigned to the terminal tracks, based on the list of railcar block classifications, the list of track classifications, and the switching parameters. After assigning the blocks to tracks, a final list of tracks that have been assigned blocks is generated.

42 Claims, 15 Drawing Sheets

Traffic Record 1 1/6/12 to 1/7/12

Traffic Record 2  1/6/12 to 1/8/12

Dwell Occupancy Pair
Arrival time = 2:00 pm, 1/6/12
Departure time = 8:00 pm, 1/6/12

Traffic Record 1 — 603

| Traffic Record 1 | |
|---|---|
| Arrival date: | 1/6/12 |
| Arrival time: | 7:15 am |
| Car cut volume: | 3 railcars |
| Outbound classification: | Chicago |
| Work classification: | Regular |
| Departure date: | 1/7/12 |
| Departure time: | 4:15 pm |

Traffic Record 1 Hourly Intervals

| Day 0, Hour 0 | | Day 1, Hour 23 — 602 |
|---|---|---|
| Unique Index Value: 0 | | Unique Index Value: 47 |
| Hour range: 0:00 - 0:59 | ... | Hour: 23:00 - 23:59 |
| Date: 1/6/12 | | Date: 1/7/12 |

Occupancy Index — 601

| Day 0, Hour 14 | Day 0, Hour 15 | Day 0, Hour 18 | Day 0, Hour 19 |
|---|---|---|---|
| Occupancy Index Value: 0 | Occupancy Index Value: 1 | Occupancy Index Value: 4 | Occupancy Index Value: 5 |
| Hour range: 14:00 - 14:59 | Hour range: 15:00 - 15:59 | Hour range: 18:00 - 18:59 | Hour range: 19:00 - 19:59 |
| Date: 1/6/12 | Date: 1/6/12 | Date: 1/6/12 | Date: 1/6/12 |

Figure 6a

Dwell Occupancy Pair
Arrival time = 2:00 pm, 1/6/12
Departure time = 8:00 pm, 1/6/12

Occupancy Index For Traffic Record 1 Dwell Occupancy Definitions

| Day 0, Hour 14 | Day 0, Hour 15 | Day 0, Hour 16 |
|---|---|---|
| Occupancy Index Value: 0 | Occupancy Index Value: 1 | Occupancy Index Value: 2 |
| Hour: 14:00-14:59 | Hour: 15:00-15:59 | Hour: 16:00-16:59 |
| Corresponding Traffic Record Index: 14 | Corresponding Traffic Record Index: 15 | Corresponding Traffic Record Index: 16 |
| Arrival Side (Beginning of Hour) Traffic Record 1 (3 cars) | Arrival Side (Beginning of Hour) Traffic Record 1 (3 cars) | Arrival Side (Beginning of Hour) Traffic Record 1 (3 cars) |
| Departure Side (End of Hour) Traffic Record 1 (3 cars) | Departure Side (End of Hour) Traffic Record 1 (3 cars) | Departure Side (End of Hour) Traffic Record 1 (0 cars) |

| Day 0, Hour 17 | Day 0, Hour 18 | Day 0, Hour 19 |
|---|---|---|
| Unique Index Value: 3 | Unique Index Value: 4 | Unique Index Value: 5 |
| Hour: 17:00-17:59 | Hour: 18:00-18:59 | Hour: 19:00-19:59 |
| Corresponding Traffic Record Index: 17 | Corresponding Traffic Record Index: 18 | Corresponding Traffic Record Index: 19 |
| Arrival Side (Beginning of Hour) Traffic Record 1 (0 cars) | Arrival Side (Beginning of Hour) Traffic Record 1 (0 cars) | Arrival Side (Beginning of Hour) Traffic Record 1 (0 cars) |
| Departure Side (End of Hour) Traffic Record 1 (0 cars) | Departure Side (End of Hour) Traffic Record 1 (0 cars) | Departure Side (End of Hour) Traffic Record 1 (0 cars) |

Figure 6b

Traffic Record 2 — 606

| | |
|---|---|
| Arrival date: | 1/6/12 |
| Arrival time: | 7:15 am |
| Car cut volume: | 3 railcars |
| Outbound classification: | Chicago |
| Work classification: | Regular |
| Departure date: | 1/8/12 |
| Departure time: | 8:15 am |

Dwell Occupancy Pair
Arrival time = 2:00 pm, 1/6/12
Departure time = 8:00 pm, 1/6/12

Traffic Record 2 Hourly Intervals

Day 0, Hour 0
Unique Index Value: 0
Hour range: 0:00 - 0:59
Date: 1/6/12

Day 2, Hour 23 — 605
Unique Index Value: 71
Hour: 23:00 - 23:59
Date: 1/8/12

Occupancy Index — 604

| Day 0, Hour 14 | Day 0, Hour 15 | Day 0, Hour 18 | Day 0, Hour 19 |
|---|---|---|---|
| Occupancy Index Value: 0 | Occupancy Index Value: 1 | Occupancy Index Value: 4 | Occupancy Index Value: 5 |
| Hour range: 14:00 - 14:59 | Hour range: 15:00 - 15:59 | Hour range: 18:00 - 18:59 | Hour range: 19:00 - 19:59 |
| Date: 1/6/12 | Date: 1/6/12 | Date: 1/6/12 | Date: 1/6/12 |

Dwell Occupancy Pair
Arrival Time = 2:00 pm, 1/6/12
Departure Time = 8:00 pm, 1/6/12

Occupancy Index For Traffic Record 2 Dwell Occupancy Definitions

| Day 0, Hour 14 | Day 0, Hour 15 | Day 0, Hour 16 602 |
|---|---|---|
| Occupancy Index Value: 0<br>Hour: 14:00-14:59<br>Corresponding<br>Traffic Record Index: 14<br>Arrival Side (Beginning of Hour)<br>Traffic Record 2 (3 cars)<br>Departure Side (End of Hour)<br>Traffic Record 2 (3 cars) | Occupancy Index Value: 1<br>Hour: 15:00-15:59<br>Corresponding<br>Traffic Record Index: 15<br>Arrival Side (Beginning of Hour)<br>Traffic Record 2 (3 cars)<br>Departure Side (End of Hour)<br>Traffic Record 2 (3 cars) | Occupancy Index Value: 2<br>Hour: 16:00-16:59<br>Corresponding<br>Traffic Record Index: 16<br>Arrival Side (Beginning of Hour)<br>Traffic Record 2 (3 cars)<br>Departure Side (End of Hour)<br>Traffic Record 2 (3 cars) |

| Day 0, Hour 17 | Day 0, Hour 18 | Day 0, Hour 19 |
|---|---|---|
| Occupancy Index Value: 3<br>Hour: 17:00-17:59<br>Corresponding<br>Traffic Record Index: 17<br>Arrival Side (Beginning of Hour)<br>Traffic Record 2 (3 cars)<br>Departure Side (End of Hour)<br>Traffic Record 2 (3 cars) | Occupancy Index Value: 4<br>Hour: 18:00-18:59<br>Corresponding<br>Traffic Record Index: 18<br>Arrival Side (Beginning of Hour)<br>Traffic Record 2 (3 cars)<br>Departure Side (End of Hour)<br>Traffic Record 2 (3 cars) | Occupancy Index Value: 5<br>Hour: 19:00-19:59<br>Corresponding<br>Traffic Record Index: 19<br>Arrival Side (Beginning of Hour)<br>Traffic Record 2 (3 cars)<br>Departure Side (End of Hour)<br>Traffic Record 2 (3 cars) |

Cross Tabulated Total

Day 0, Hour 14
Occupancy Index Value: 0
Hour: 14:00-14:59

Arrival Side (Beginning of Hour)
Traffic Record 1 (3 cars)
Traffic Record 2 (3 cars)
Total: 6 cars Departure Side (End of Hour)
Traffic Record 1 (3 cars)
Traffic Record 2 (3 cars)
Total: 6

Day 0, Hour 15
Occupancy Index Value: 1
Hour: 15:00-15:59

Arrival Side (Beginning of Hour)
Traffic Record 1 (3 cars)
Traffic Record 2 (3 cars)
Total: 6 cars Departure Side (End of Hour)
Traffic Record 1 (3 cars)
Traffic Record 2 (3 cars)
Total: 6

Day 0, Hour 16
Occupancy Index Value: 2
Hour: 16:00-16:59

Arrival Side (Beginning of Hour)
Traffic Record 1 (3 cars)
Traffic Record 2 (3 cars)
Total: 6 cars Departure Side (End of Hour)
Traffic Record 1 (0 cars)
Traffic Record 2 (3 cars)
Total: 3

Day 0, Hour 17
Occupancy Index Value: 3
Hour: 17:00-17:59

Arrival Side (Beginning of Hour)
Traffic Record 1 (0 cars)
Traffic Record 2 (3 cars)
Total: 3 cars Departure Side (End of Hour)
Traffic Record 1 (0 cars)
Traffic Record 2 (3 cars)
Total: 3

Day 0, Hour 18
Occupancy Index Value: 4
Hour: 18:00-18:59

Arrival Side (Beginning of Hour)
Traffic Record 1 (0 cars)
Traffic Record 2 (3 cars)
Total: 3 cars Departure Side (End of Hour)
Traffic Record 1 (0 cars)
Traffic Record 2 (3 cars)
Total: 3

Day 0, Hour 19
Occupancy Index Value: 5
Hour: 19:00-19:59

Arrival Side (Beginning of Hour)
Traffic Record 1 (0 cars)
Traffic Record 2 (3 cars)
Total: 3 cars Departure Side (End of Hour)
Traffic Record 1 (0 cars)
Traffic Record 2 (3 cars)
Total: 3

Figure 8

Occupancy Index For Traffic Record 4     801

| Day 0, Hour 14 | Day 0, Hour 15 | Day 0, Hour 16 | Day 0, Hour 17 | Day 0, Hour 18 | Day 0, Hour 19 |
|---|---|---|---|---|---|
| Unique Index Value: 0<br>Hour: 2pm-3pm | Unique Index Value: 1<br>Hour: 3pm-4pm | Unique Index Value: 2<br>Hour: 4pm-5pm | Unique Index Value: 3<br>Hour: 5pm-6pm | Unique Index Value: 4<br>Hour: 6pm-7pm | Unique Index Value: 5<br>Hour: 7pm-8pm |
| Arrival Side: 3 cars<br>Departure Side: 3 cars | Arrival Side: 3 cars<br>Departure Side: 3 cars | Arrival Side: 0 cars<br>Departure Side: 0 cars | Arrival Side: 0 cars<br>Departure Side: 0 cars | Arrival Side: 0 cars<br>Departure Side: 0 cars | Arrival Side: 0 cars<br>Departure Side: 0 cars |

Occupancy Index For Traffic Record 5     802

| Day 0, Hour 14 | Day 0, Hour 15 | Day 0, Hour 16 | Day 0, Hour 17 | Day 0, Hour 18 | Day 0, Hour 19 |
|---|---|---|---|---|---|
| Unique Index Value: 0<br>Hour: 2pm-3pm | Unique Index Value: 1<br>Hour: 3pm-4pm | Unique Index Value: 2<br>Hour: 4pm-5pm | Unique Index Value: 3<br>Hour: 5pm-6pm | Unique Index Value: 4<br>Hour: 6pm-7pm | Unique Index Value: 5<br>Hour: 7pm-8pm |
| Arrival Side: 0 cars<br>Departure Side: 0 cars | Arrival Side: 0 cars<br>Departure Side: 0 cars | Arrival Side: 3 cars<br>Departure Side: 3 cars | Arrival Side: 3 cars<br>Departure Side: 3 cars | Arrival Side: 0 cars<br>Departure Side: 0 cars | Arrival Side: 0 cars<br>Departure Side: 0 cars |

Occupancy Index For Traffic Record 6     803

| Day 0, Hour 14 | Day 0, Hour 15 | Day 0, Hour 16 | Day 0, Hour 17 | Day 0, Hour 18 | Day 0, Hour 19 |
|---|---|---|---|---|---|
| Unique Index Value: 0<br>Hour: 2pm-3pm | Unique Index Value: 1<br>Hour: 3pm-4pm | Unique Index Value: 2<br>Hour: 4pm-5pm | Unique Index Value: 3<br>Hour: 5pm-6pm | Unique Index Value: 4<br>Hour: 6pm-7pm | Unique Index Value: 5<br>Hour: 7pm-8pm |
| Arrival Side: 0 cars<br>Departure Side: 0 cars | Arrival Side: 0 cars<br>Departure Side: 0 cars | Arrival Side: 0 cars<br>Departure Side: 0 cars | Arrival Side: 0 cars<br>Departure Side: 0 cars | Arrival Side: 3 cars<br>Departure Side: 3 cars | Arrival Side: 3 cars<br>Departure Side: 3 cars |

SYSTEM AND METHOD FOR TERMINAL CAPACITY MANAGEMENT

TECHNICAL FIELD

The present invention is in the field of rail terminal capacity management. More particularly, the present invention is in the field of determining terminal capacity needs based on terminal traffic data.

BACKGROUND OF THE INVENTION

An important part of rail terminal planning and design is the modeling and analyzing of terminal congestion and traffic. Typically, congestion and traffic patterns of rail terminals are modeled using micro-simulation tools that simulate the movement of railcars on terminal tracks in precise detail. These micro-simulation tools typically require creating extraordinarily detailed virtual representations of a terminal to simulate the layout and traffic patterns of every train traveling through the terminal. For example, micro-simulation packages such as Arena® Simulation Software, typically require detailed information about the size and layout of every track in a terminal. Further, these micro-simulation tool packages are typically not intended to support the detailed modeling of terminals, and therefore only provide general modeling objects to simulate the components of a virtual terminal. Thus, simulating a terminal track typically requires making significant adaptations to general modeling objects to represent a terminal track modeling object. Accordingly, designing a virtual terminal typically requires a significant amount of time a resources. Once a virtual terminal has been created, the micro-simulation packages then typically require an immense amount of time to model traffic flow in the virtually simulated terminal, typically on the order of several days. Performing a sensitivity analysis around a parameter or variable of the terminal, or analyzing how the change in the design of a terminal would affect traffic flow, requires reiteratively modifying a parameter and then performing a full simulation of the modified virtual terminal. As a result, modeling terminal traffic and congestion patterns with micro-simulation tools typically consumes an excessive amount of time and resources. Thus, micro-simulation tools are not particularly suitable for strategic planning decisions that involve quick and high-level estimates of traffic and congestion patterns across a potentially large amount of terminals competing for investment resources.

Another drawback of micro-simulation tools is their reliance on preexisting data. Instead of simulating traffic and congestion patterns with forecasted or projected information, these tools typically run on information about tracks that have already been built and traffic data measured at some point in the past. For example, micro-simulation tools typically operate on information about the existing layout of a terminal, the size of tracks within the terminal, and traffic and congestion data measured at the terminal in the past. Rail terminals may then analyze sizing and demand performance by iteratively making incremental changes, using the preexisting track layout, and traffic and congestion data as a starting point. Thus, micro-simulation tools are typically used to model modifications or adjustments to operational terminals that have already been built. However, these micro-simulation tools are not generally capable of modeling traffic and congestion patterns of terminals that have yet to be built, i.e., still in their conceptual and functional planning or development stages. In this stage, planned terminals typically have no initial layouts on which the above-mentioned iterative analysis can be based, and only forecasted traffic and congestion data are available, because the planned terminals are still conceptual. Thus, forecast data is not particularly suitable for estimating terminal core infrastructure needs of planned terminals through micro-simulation tools, as such tools require much more information, especially in terms of terminal infrastructure layout. Accordingly, there is a need for simulation tools that can model traffic and congestion patterns of rail terminals still in their planning or development stages, on the basis of high-level historical or forecast data.

In addition to modeling traffic and congestion data, rail terminals typically model the assignment of railcars to terminal tracks to determine terminal track number and size needs. However, similarly to traffic and congestion modeling, the track assignment analysis with micro-simulation tools also rely on preexisting layouts and historical traffic and congestion data. Thus, as with traffic and congestion modeling, an initial detailed layout of preexisting terminal tracks is required in order to model the assignment of railcar blocks to terminal tracks. Further, as with traffic and congestion data, these micro-simulation tools are not generally used to model the block to track assignment of rail terminals still in their planning or development stages when no initial layouts of the terminal or historical traffic and congestion data are available. Moreover, since these micro-simulation tools typically require detailed, preexisting track information as well as iterative modifications to track information, modeling a terminal's track assignment typically consumes a significant amount of time and resources. That is, micro-simulation tools typically do not determine the number or size of tracks needed to meet a terminal's capacity demand; micro-simulation tools generally require creating a virtual terminal, reiteratively changing the number or size of tracks, and performing a full simulation of the traffic flow with each iteration. As noted above, this process is extremely time and resource intensive.

Yet another important part of rail terminal planning is the systematic collection of railcar inventory and terminal capacity data. Monitoring railcar inventory helps rail terminals balance consumer demand for transportation to specific destinations with railcar supply. By monitoring the use and storage of railcars at a given rail terminal, rail terminals may optimize the use of their railcar inventory by providing more railcars to destinations that attract the most customers and create the least amount of traffic and congestion. However, because of constraints on terminal resources, rail terminals typically only generate daily snapshots of railcar inventory and terminal capacity statistics. Frequently, the daily snapshots of inventory and capacity demand are taken on an ad hoc basis, or in the context of high-level, and highly granular reports generated once every morning. In either case, rail terminals typically do not measure railcar inventory and terminal capacity frequently enough to analyze the peaks and troughs of capacity demands throughout a given day. As a result, rail terminals typically cannot determine terminal infrastructure that will support traffic in a sustainable fashion and allow rail terminals to "design for failure". Similarly, micro-simulation tools that use past traffic data, terminal layout, and track size information are typically too time- and resource-intensive to simulate railcar inventory and terminal capacity on a frequent basis, and cannot provide strategic answers in a time effective fashion.

Accordingly, terminal capacity planning tools of the prior art have several disadvantages, because they do not efficiently determine a terminal's track number or size needs, or model a terminal's block to track assignment, without relying on detailed preexisting track and terminal layout information. Further, terminal capacity planning tools of the prior art do not track or simulate railcar inventory and terminal capacity on a frequent basis. Other disadvantages exist.

The disclosed terminal capacity tool is directed to overcoming one or more of the disadvantages listed above.

SUMMARY OF THE INVENTION

Designs for a terminal capacity management system are disclosed. In one particular exemplary embodiment of the invention, a train traffic record dataset containing traffic records is accessed from a database. The train traffic records are then indexed into discrete time periods, such as daily and hourly periods. Each period is assigned a unique index value. Each traffic record is assigned a dwell occupancy definition used to determine which traffic records are associated with a particular arrival time or departure time. Dwell occupancy indexes are created with periodic intervals. Dwell occupancy indexes are then assigned dwell occupancy values based on the dwell occupancy definitions and the traffic record dataset. Capacity of the train terminal may be determined by cross-tabulating the occupancy dwell periods, and applying a fluidity factor to one or more parameters.

In one aspect of the invention, the traffic record dataset is created by tracking arrival and departure times of railcars at a train terminal having the same outbound classification or handling instruction.

In yet another aspect of the invention, the train terminal may be subdivided into a receiving yard, a classification bowl, and a forwarding yard.

In another aspect of the invention, the traffic records are modified according to one or more business rules. The business rules allow the rail terminals to perform a sensitivity analysis of the terminal capacity demand.

In one aspect of the invention, the number of different outbound classifications present within a facility within a specified time interval may be determined. Other values may be determined, including an average hourly railcar inventory, an average daily maximum hourly railcar inventory, a minimum hourly railcar inventory, a maximum hourly railcar inventory, and a range between the minimum hourly railcar inventory and the maximum hourly railcar inventory. In one embodiment of the invention, a graphical display of terminal capacity and these other values may be generated over a specified time interval.

In another particular embodiment, the number and size of tracks needed to accommodate a terminal may be determined by assigning blocks of railcars to terminal tracks. A list of railcar blocks destined to the same successive handling point at a terminal is created. Based on this list of railcar blocks, a list of railcar block sizes and railcar block classifications is created. A list of track classifications is created based on this list of railcar blocks and tracks available at the terminal. Switch, i.e., railcar handling, parameters are then specified. After specifying switch parameters, a list of railcar blocks is evaluated based on the list of railcar block sizes and the list of railcar block classifications. Once the list of railcar blocks is evaluated, a list of railcar blocks is assigned to the terminal tracks, based on the list of railcar block classifications, the list of track classifications, and the switching parameters. Finally, a list of tracks that have been assigned blocks is generated.

In one aspect of the invention, switching parameters allow rail terminals to perform sensitivity analyses for determining track numbers and sizes. Switching parameters include the maximum number of cars that may be held in one classification track, the maximum number of blocks to be held in one classification track, the standard length of a railcar, and the minimum track length.

Another exemplary embodiment of the invention comprises a dataset engine that provides a list of railcar blocks destined to the same handling point at a terminal, a classification engine that classifies railcar blocks according to size and terminal tracks according to traffic volume, and a switching parameter engine. The switching parameter engine specifies switching parameters and generates a list of classified blocks according to the switching parameters. There is also an assignment engine for assigning railcar blocks to terminal tracks.

BRIEF DESCRIPTION OF THE DRAWINGS

FIG. 6a is a diagram of indexed traffic records, according to one embodiment of the present invention.

FIG. 6b is a diagram of the occupancy indexes assigned occupancy values based on indexed traffic record data of FIG. 6a, according to one embodiment of the present invention.

FIG. 6c is another diagram of indexed traffic records, according to one embodiment of the present invention.

FIG. 6d is a diagram of the occupancy indexes assigned occupancy values based on indexed traffic record data of FIG. 6c, according to one embodiment of the present invention.

FIG. 7 is a diagram illustrating the cross tabulation of occupancy indexes, according to one embodiment of the present invention.

FIG. 8 is a diagram illustrating the graphical display of indexed traffic record data, according to one embodiment of the present invention.

DETAILED DESCRIPTION OF THE INVENTION

Figure 1:
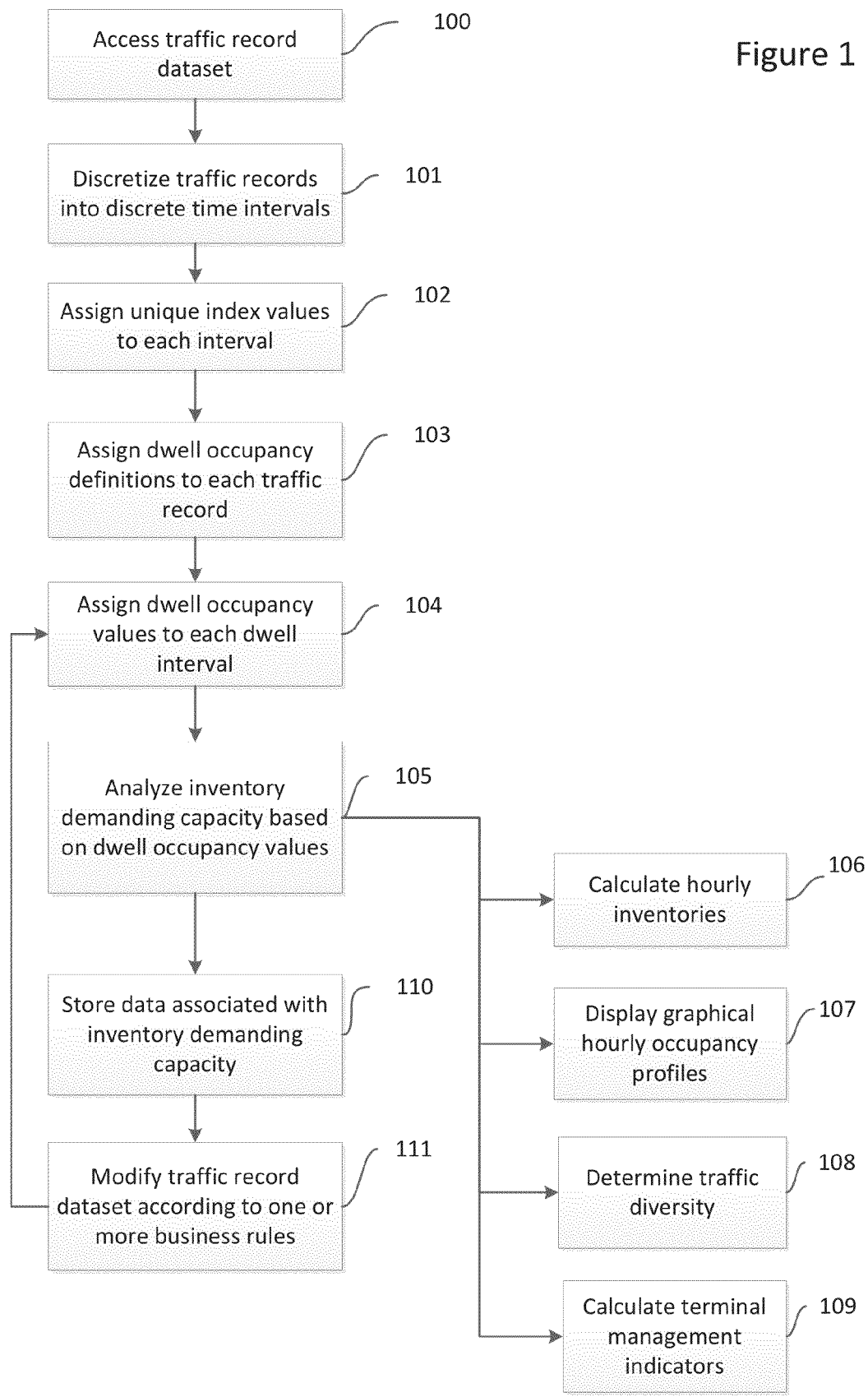
FIG. 1 is a diagram of an exemplary method for indexing traffic record, in accordance with one embodiment of the invention.
Figure 5A:
FIG. 5a is a diagram of an indexed traffic record according to one embodiment of the present invention.
Figure 5B:
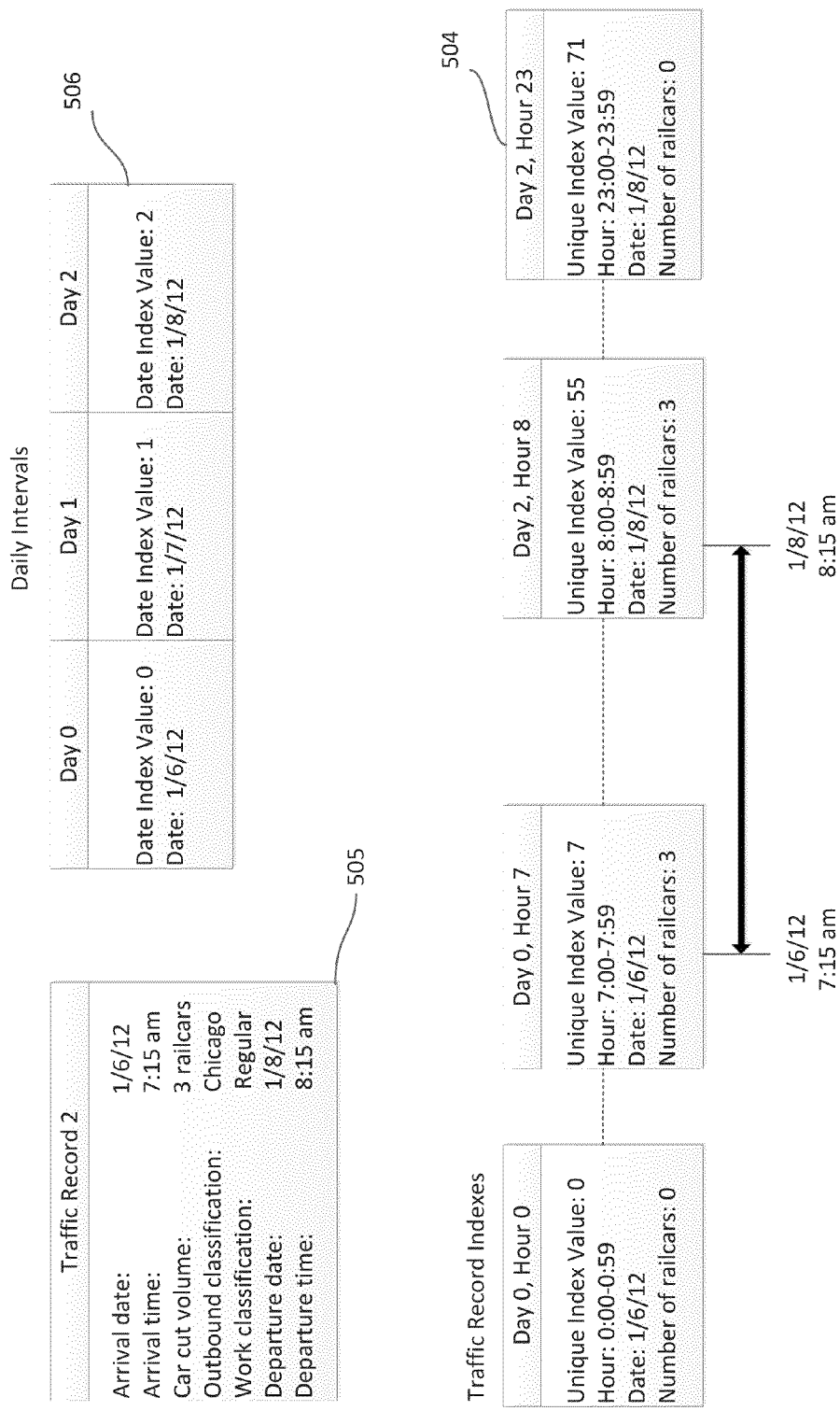
FIG. 5b is a diagram of yet another indexed traffic record according to one embodiment of the present invention.

Referring to FIG. 1, a method of determining terminal capacity according to one embodiment of the invention is depicted. The method begins by accessing a traffic record dataset, 100, which is a structured collection of terminal traffic data. Traffic record datasets may be structured as a collection of traffic records, with each traffic record containing data about a train's arrival or departure information at a terminal. For example, a traffic record may include a train's arrival date and time, single car volume, car cut volume, outbound classification, work classification (such as, but not limited to, regular connection, block swap, and the like), and departure date and time. In one embodiment of the invention, the car cut volume applies to groups of multiple cars. A dataset may further include inbound and outbound train plans and block classifications, such as jumbo, large or small, as discussed below, with respect to the block to track assignment process depicted in FIG. 11. FIGS. 5a and 5b depicts an example of a set of traffic records.

In one aspect of the invention, traffic records may contain backward-looking data, i.e., historical data gathered from measurements taken at rail terminals in the past. In another aspect of the invention, traffic records may contain forward-looking, i.e., forecast data, generated based on anticipated or projected values. Generally, rail terminal planning and design tools rely on backward-looking traffic data, rather than forward-looking forecast or projected traffic data. For example, micro-simulation tools typically create simulations using terminal traffic and congestion data from traffic measurements made at the terminal in the past. However, these micro-simulation tools are not generally capable of modeling traffic and congestion patterns of rail terminals using forward-looking forecast or projected data. Thus, the micro-simulation tools are not generally capable of modeling traffic and congestion patterns of rail terminals still in their planning or development stages, i.e., conceptual rail terminals, because at this stage, rail terminals typically do not have backward-looking traffic data, or terminal track layout data. Accordingly, by storing and accessing data that accommodate forward and backward looking data, rail terminals may estimate terminal core infrastructure needs on the basis of forecast data, without necessarily using initial track layout or historical traffic and congestion data.

To reflect the operating reality that railcars are typically switched in groups, traffic records are preferably recorded as inbound cuts of rail cars, which are groups of one or more rail cars. Moreover, traffic records stored as inbound cuts of rail cars may provide a manageable level of granularity for accessing traffic data.

Traffic record datasets may be maintained as a structured collection of data stored in a central data repository, i.e., a data warehouse, such as Teradata's Active Data Warehouse®, IBM's InfoSphere Warehouse®, or Oracle's Warehouse Builder 11g®, or a database management system such as Microsoft Access®, SQL Server®, IBM DB2®, or MySQL®. In another aspect of the invention, the traffic dataset may be a data table generated from internal or external operating plan development tools. Traffic record datasets may be accessed by submitting queries to the databases storing the traffic records. Queries may be written in a high-level programming query language such as SQL, or LDAP. The simple query structures and limited data granularity required by the invention conceptually allow deployment across generally non-custom data storage and querying solutions.

Traffic records may be accessed according to a specific date range. A date range is first determined or selected. After a date range is chosen, the traffic records that fall within the determined or selected date range are then selected. For example, a date range beginning on Jan. 1, 2012, and ending on Jan. 10, 2012 may be chosen. However, the dataset may only contain data for the 3rd, 6th, and 7th of Jan., 2012. Accordingly, only the traffic records for the 3rd, 6th, and 7th of Jan., 2012 may be selected and accessed from the traffic record dataset. That is, the resulting timeframe is identified on the basis of the dates selected. The traffic records are then sorted chronologically by date. FIGS. 5a and 5b depict an example of these traffic records.

Figure 2:
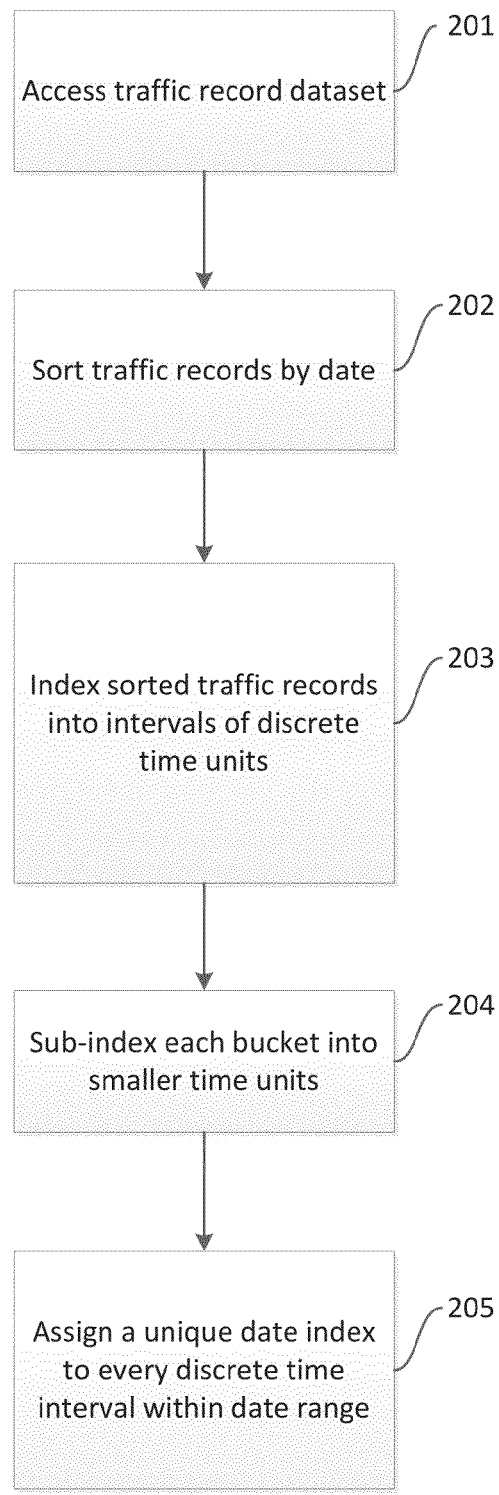
FIG. 2 is a diagram of an exemplary method for sub-indexing traffic records into smaller periodic time intervals, in accordance with one embodiment of the invention.

Referring to step 101 in FIG. 1, once the traffic records have been accessed, traffic records are then discretized into smaller periodic time intervals. The process of discretizing each time interval is shown in more detail in steps 202-204 of FIG. 2. As FIG. 2 illustrates, after selecting traffic records within a specific date range, as step 202 shows, a traffic record is sorted chronologically, and then divided into periods of discrete time units, as shown in step 203. These time units may be, for example, in terms of days, as illustrated by traffic record 502 in FIG. 5a. These daily intervals may then be subdivided into steps of smaller units, such as hourly intervals, as shown in step 204, and illustrated by traffic record 503. In step 205 each discrete time interval is then assigned a unique date index value, as depicted by 501 in FIG. 5a. The discrete periods may be indexed using the query programming languages described above. Preferably, the daily period index values will be zero-based, or in other words, the indexing will start with a value of zero. For example, traffic records may be indexed into daily, and hourly time periods, with the first index having a value of zero, as illustrated in detail in FIG. 5a. Those skilled in the art would appreciate that the traffic records may be indexed into any finite time unit, such as half-hour, or quarter-hour time intervals. In one embodiment of the invention, the first index corresponds to the first hour of the first day of the relevant timeframe. For example, the first index depicted by 503 in FIG. 5a corresponds to the first hourly interval (i.e., between 12:00 am and 12:59 am) in the relevant timeframe that starts on Jan. 6, 2012, 7:15 am to Jan. 7, 2012, 4:15 pm. Thus, even though the railcars do not arrive until 7:15 am, the hourly intervals begin at the first hour of the day (i.e., between 12:00 am and 12:59 am). Other traffic records, are likewise indexed starting with the first hourly interval of the first day. For example, the first index depicted by 504 in FIG. 5b corresponds to the first hourly interval (i.e., between 12:00 am and 12:59 am) in the relevant timeframe that starts on Jan. 6, 2012, 7:15 am to Jan. 8, 2012, 8:15 am. Fixing multiple traffic records to the same starting index allows for the cross tabulation of dwell occupancy values, as discussed in more detail below. Those of ordinary skill in the art will appreciate that the starting index of traffic records may be fixed to other time intervals.

As described above in steps 203 and 204, traffic records may be first discretized into daily time units, and then further subdivided into smaller time units, such as hourly periods. Thus, each daily interval may be further subdivided into 24 hour-long intervals. As with the daily intervals, each hourly interval may be uniquely indexed. The beginning and end of the intervals may defined by business rules. For example, business rules may define each hour-long interval to begin at the first minute of each relevant hour and end at the 59th minute of that hour. Each hourly period may then be associated with a unique index in accordance with the following formula:

$$\text{Index Value of hourly period } j \text{ is equal} = H_j + 24 * D_n$$

where $H_j$ is the $j^{th}$ hour of 24-hour clock, and $D_n$, is the date index value associated with the $n^{th}$ day of the date index range. The indices of the hourly periods are preferably zero-based. Accordingly, the first hourly period will have an index value of zero (0), and the last hourly period in the date range of the traffic record dataset will have the highest index value within the index value set. The total number of unique index values in an index value set for a given dataset is 24*n. Conversely, index values will range from 0 to 24*n. In this context, the time horizon, and therefore the relative values of days within the time horizon, are programmatically identified and indexed through custom indexing functions.

In this way, hourly periods on two different days can be indexed uniquely. As a result, a sensitivity analyses can be performed over multiple days without duplicating the representation of traffic records. That is, if a terminal is studying the traffic data over the course of multiple days, the traffic data for the same hour on two separate days will not be duplicated or counted twice, because each hourly period of each day has a unique index value. For example, the 23:00 to 23:59 hourly period on day 0 may contain a different index value than the 23:00 to 23:59 hourly period on day 1; the 23:00 to 23:59 hourly period on day 0 may have an index value of 0, while the 23:00 to 23:59 hourly period on day 1 may have an index value of 24. Thus, indexing traffic records in discrete hourly intervals provides the benefit of avoiding duplicate representation of traffic records when analyzing multi-day timeframes, which is typically what is required for most rail terminals to adequately represent traffic development patterns and associated capacity demands.

Referring to step 103 in FIG. 1, dwell occupancy definitions are then assigned to each traffic record. Dwell occupancy definitions are used to determine which traffic records are associated with a particular arrival time or departure time, by defining start and end times (i.e., "occupancy limits") that a block of railcars have occupied the terminal. Thus, each traffic record may be assigned a pair of values, such as an arrival time and a departure time, that define the limits of an occupancy period. For example, traffic records 1 and 2, depicted in FIGS. 6a and 6c may be assigned an occupancy arrival time of 2:00 pm, and departure time of 8:00 pm.

Following steps 102 and 103 described above, occupancy indexes for traffic records 1 and 2, 601 and 60, may then be created for associating each interval of a traffic record with an interval of the occupancy definition. That is, each occupancy definition may be divided into occupancy intervals.

Each occupancy interval may then be indexed and associated with a traffic record index. As explained in more detail below, the present invention may use the occupancy intervals to tabulate information across each occupancy interval index, such as the number of railcars parked at the terminal, and calculate total railcar inventory and demand. The occupancy indexes are discretized into intervals that are the same length in time as the discretized traffic records. For example, the occupancy indexes for traffic records 1 and 2 are divided into hour-long time intervals that match the hour-long time intervals of traffic records 1 and 2, as depicted in 601 and 604, in FIGS. 6a-6d. However, these indexes start at 2:00 pm and end at 8:00 pm.

Referring to step 104 in FIG. 1, dwell occupancy values are then assigned to each occupancy index. Each occupancy index is given a value associated with a matching traffic record interval value. That is, the traffic information (e.g., railcar volume) associated with each traffic record in the dataset may be programmatically assigned to one or more hourly buckets across one or more days within the simulation timeframe. First, each occupancy interval is matched with the corresponding traffic interval. For example, FIG. 6b shows that Occupancy index 0 of 601 is associated with Traffic Record index 14 of 503 in FIG. 5a. Similarly, Occupancy index 0 of 604 in FIG. 6d is associated with Traffic Record index 14 of 504 in FIG. 5b. The values of the occupancy indexes may then be assigned the values of the traffic records. The value of a given occupancy interval may be associated with the value of a given traffic record hourly interval by using either the traffic record's arrival side (i.e., beginning-of-hour) traffic information, or departure side (i.e., end-of-hour) traffic information. The assignment of occupancy value associated with the arrival side (i.e., beginning-of-hour) traffic information, is based on the traffic record information of the beginning of each hour. That is, the traffic record is checked to determine if railcars are still located at the terminal at the beginning of each hourly interval; if the traffic record indicates that a number of railcars will still be located at the terminal at the beginning of the hour, then the occupancy interval is assigned that number. For example, to determine the arrival side occupancy value for occupancy index 2 depicted in 601 of FIG. 6b, the traffic information of traffic record index 16 is analyzed to determine if railcars are still located at the terminal at the beginning of that hourly interval. The beginning of the hourly interval of occupancy index 2 (i.e., traffic record index 16) is 4:00 pm. The traffic record information at traffic record index 16 indicates that there will be 3 railcars located at the terminal at that time, because the railcars do not depart until 4:15 pm. Accordingly, the occupancy value for occupancy index 2 is 3, because there are 3 railcars located at the terminal at 4:00 pm, the beginning of that hourly interval. Conversely, the assignment of occupancy value associated with the departure side (i.e., end-of-hour) traffic information, is based on the traffic record information of the end of each hourly interval. That is, the assignment is determined based on whether railcars are still located at the terminal at the end of the hourly interval. For example, to determine the departure side occupancy value for occupancy index 2 depicted in 601 of FIG. 6b, the traffic information of traffic record index 16 is analyzed to determine if railcars are still located at the terminal at the end of that hourly interval. The end of the hourly interval of occupancy index 2 (i.e., traffic record index 16) is 4:59 pm. The traffic record information at traffic record index 16 indicates that there will be no railcars located at the terminal at that time, because the railcars departed at 4:15 pm. Accordingly, the occupancy value for occupancy index 2 is 0, because there are no railcars located at the terminal at 4:59 pm, the end of that hourly interval.

Because each interval of the occupancy index has a unique value, rail terminals may perform sensitivity analyses that span multiple days, without duplicating the representation of traffic records. That is, if a terminal is studying the traffic data over the course of multiple days, the traffic data for the same hour on two separate days will not be duplicated or counted twice, because each hourly period of each day has a unique value occupancy index value. For example, if the 23:00 to 23:59 hourly period of day 0 in a traffic record may be assigned to occupancy index 1, the 23:00 to 23:59 hourly period of day 1 would be assigned to occupancy index 25.

Referring to step 105 in FIG. 1, inventory capacity demand is then analyzed based on dwell occupancy values. For example, hourly inventory capacity demand may be calculated by cross-tabulating the railcar volumes in each occupancy index, as illustrated in step 106. The contents of each occupancy index may be summed vertically, i.e., across rows, to obtain an estimate of the railcar inventory staged at the terminal as of the end of each time period of each day, as illustrated in FIG. 7. Thus, for any given time interval of any given day, a terminal may determine the number of railcars staged at a terminal. Thus, by cross-tabulating the occupancy values of traffic records, rail terminals may obtain detailed railcar inventory information for every hour—or any periodic time interval, such as half-hour, or quarter-hour—of every day, over the course of multiple days. In contrast, current terminal inventory analysis tools typically only generate daily "snapshot" reports, that contain minimum and/or maximum daily yard production volumes. Rail terminals then typically determine inventory based on these minimum and/or maximum daily yard production volumes, which are generally less accurate for determining actual inventory and capacity demand as compared to the occupancy indexing method described above.

The use of a computer processor to create hourly interval indexes, retrieve dwell occupancy values and calculate inventory capacity demand allows rail terminals to analyze terminal capacity needs quickly and efficiently. For example, the use of a computer processor makes it possible for rail terminals to quickly and efficiently process large amounts of traffic data, that otherwise would be too time and labor intensive to analyze manually. A typical terminal may generate thousands of traffic records in a given day. The use of a computer processor is integral to programmatically retrieving traffic records, indexing the traffic records in periodic time intervals (e.g., hourly time intervals), allocating dwell occupancy values and calculating inventory capacity demand. A computer processor enables terminals and those making strategic investment decisions across many terminals to make strategic planning decisions concerning a terminal's capacity demand quickly and efficiently.

In one aspect of the invention, a graphical overview of a terminal's hourly railcar inventory may be generated by conditionally formatting the periods of each traffic record. Referring to step 107 in FIG. 1, the traffic records may be conditionally formatted by, for example, color coding each record. Generating graphical overviews of railcar inventory allows rail terminals to visually analyze and detect traffic congestion patterns. For example, a staircase-like succession of colored time periods that proceeds vertically down the traffic records and horizontally through successive time periods, as depicted in FIG. 8, is indicative of a fairly smooth development and processing of railcar inventory. Conversely, a group of colored time periods that grows both vertically (i.e., across traffic records), and horizontally (i.e., across time periods), is indicative of increasing traffic dwells, which in turn, indicates potential traffic congestion issues to the rail terminal. In another aspect of the invention, the graphical display may be controlled to filter the data that is conditionally formatted. For example, the graphical display may only color code traffic records with rail cars above a certain volume.

Referring to step 108 in FIG. 1, in yet another aspect of the invention, a rail terminal's traffic diversity may be determined. Traffic diversity may be determined by analyzing the number of different outbound classifications present within the rail terminal at any given hour. Because multiple traffic records may have the same outbound classification, each outbound classification is only counted once for a rail terminal during a given time period. Thus, for the purposes of determining traffic diversity, each separate outbound classification is only counted once every time interval. For example, even though traffic records may indicate that four different trains have an outbound destination of Chicago, the Chicago destination will only be counted once in determining traffic diversity. For hump yards, traffic diversity may be designated in terms of the receiving yard, classification bowl, and forwarding yard.

Referring to step 109 in FIG. 1, after determining railcar inventory and traffic diversity calculations, as outlined in steps 106 and 108 above, several rail terminal management indicators may be calculated on the basis of hourly railcar inventory. These include, without limitation, maximum hourly railcar inventory, average hourly railcar inventory, average daily maximum hourly railcar inventory, minimum hourly railcar inventory, maximum hourly railcar inventory, or range between minimum and maximum hourly railcar inventory. A similar range of statistics may be calculated for traffic diversity, such as maximum, minimum, or average number of outbound classifications.

In one aspect of the invention, all of the rail terminal management indicators listed above may be converted into dynamic capacity demand estimates by applying a fluidity factor to the inventory statistics. Dynamic rail terminal capacity demand estimates, in contrast to the static rail terminal capacity demand estimates, take into account both the staging of railcars parked in a rail terminal, and also the processing of railcars during the classification stage, where railcars typically move about a rail terminal. That is, fluidity factors help account for parking and movement during the classification process in modeling rail terminal traffic. Fluidity factors are scaling factors that reflect the movement of railcars throughout a rail terminal as a ratio of railcar inventory to actual rail terminal capacity for both staging and classification processing. For example, a fluidity factor of 0.6 implies that a railcar inventory of 60 cars will require 100 cars of actual rail terminal capacity for both staging and classification processing. Alternative values can be specified for sensitivity analyses by users. Rail terminals are preferably sized on the basis of dynamic capacity demand estimates, rather than static capacity demands. Typically, static capacity demand is first calculated to derive dynamic capacity demand. Thus, the ability to quickly and efficiently calculate static capacity demand using the indexing process described in steps 101-109 above further allows rail terminals to quickly and efficiently calculate dynamic capacity demand.

Figure 9:
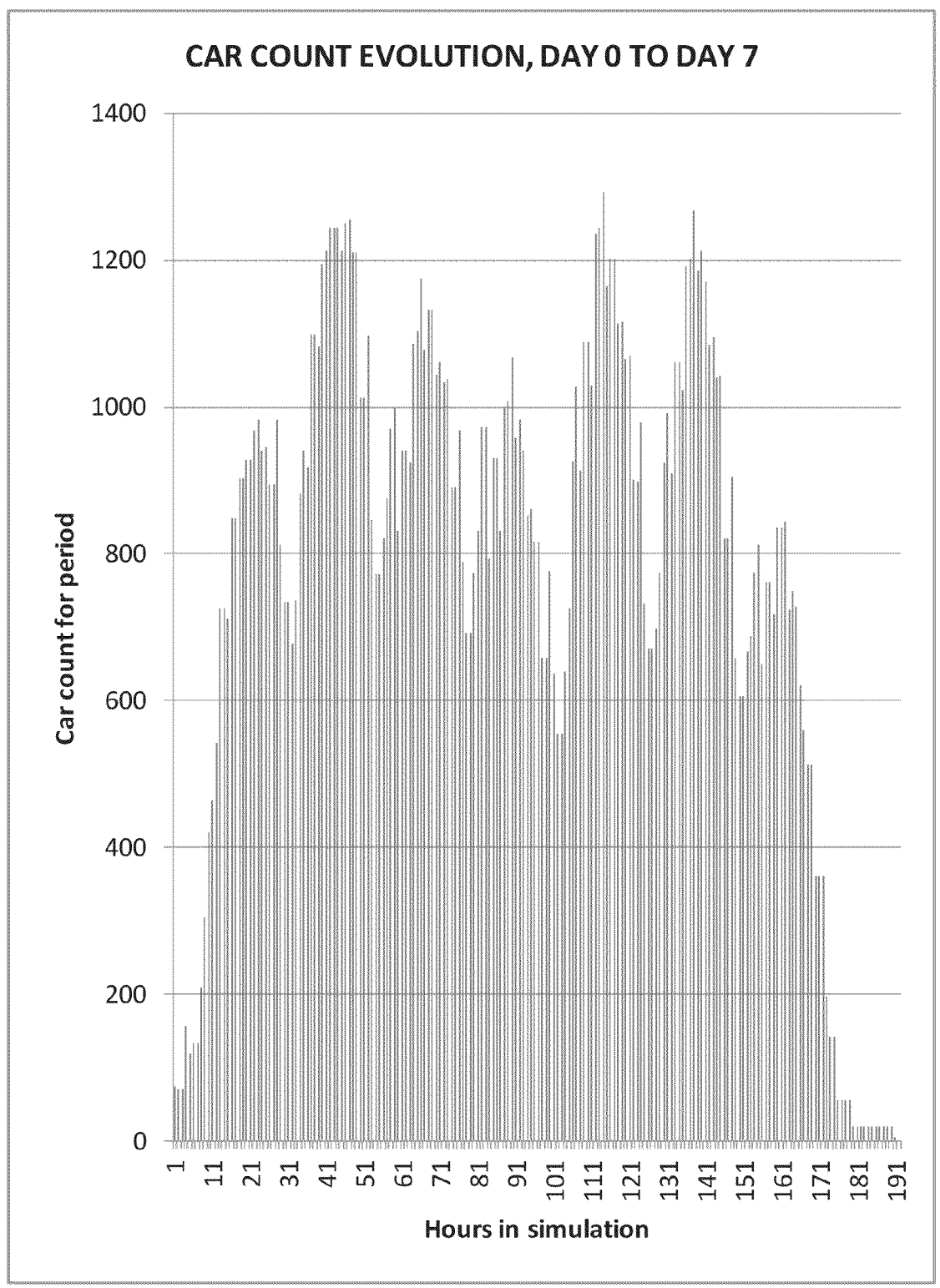
FIG. 9 is a diagram illustrating the a chart of indexed traffic record data, according to one embodiment of the present invention.

In another aspect of the invention, graphical displays of the rail terminal management indicators described above may be generated. For example, a chart showing evolution of hourly railcar inventory may be generated, as illustrated in FIG. 9, or a chart showing evolution of hourly traffic diversity. Railcar inventory charts allow rail terminals to quickly and visually analyze both inventory and therefore capacity demand peaks, and inventory capacity patterns. For example, railcar inventory charts allow rail terminals to determine when they become "heavy" throughout the course of an operating day.

Referring to step 110 in FIG. 1, the data associated with inventory capacity demand may be stored in a database.

Referring to step 111 in FIG. 1, the traffic record dataset may be modified according to one or more business rules. Business rules allow rail terminals perform sensitivity analyses that model the differences in existing rail terminal traffic flow with projected or target traffic data. For example, business rules can be used to model the change in efficiency of rail terminal traffic flow caused by changing the average dwell time of that particular terminal and potentially in respect of a specific traffic type handled by that terminal. More specifically, if a particular group of traffic typically arrives at a rail terminal at 2:00 pm, and departs to a customer location at 8:00 pm, for a dwell period of 6 hours, the rail terminal may model the change in efficiency by decreasing the dwell time to 4 hours, or in other words, by departing at 6:00 pm, rather than 8:00 pm. Significantly, this allows rail terminals to determine capacity needs without relying on historical data, detailed preexisting track layout information, or detailed micro-simulation tools. As a result, rail terminals may use forecasted and/or projected traffic data to predict terminal capacity needs for terminals still in the planning and development stages. Moreover, terminals may update traffic record data with projected and/or forecasted data, and analyze the results in a quick and efficient manner.

To model how terminal traffic flow changes when a particular group of traffic is set to depart at an earlier or later departure time, a business rule is applied that updates the departure timestamps of the traffic records. After updating the departure timestamps, the traffic records are divided into new intervals, which are then re-indexed. The occupancy indexes are then associated with the updated traffic record intervals, and reassigned new values corresponding to the new traffic record associations. Average dwell values may be recalculated by cross tabulating the occupancy index values, as described in step 105 above. Thus, by applying business rules, rail terminals may perform sensitivity analyses by simulating changes in actual or planned dwells for a given type of connection. Business rules may change according to the structure of the input dataset.

Figure 10:
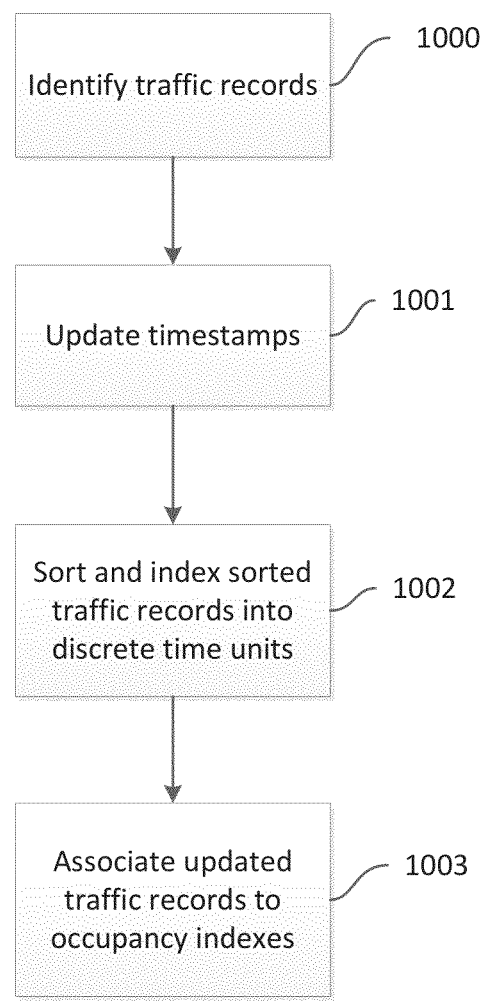
FIG. 10 is a diagram of the method of applying business rules to traffic record data, according to one embodiment of the present invention.

Steps 1000-1003 in FIG. 10 illustrate the steps of applying the business rules to the traffic record dataset. Referring to step 1000, the traffic records to update are identified. Referring to step 1001, the arrival and departure times of the traffic record timestamps are updated with new values according to the business rules. In step 1002, the traffic records are then sorted and divided into discrete time intervals, and re-indexed into new traffic record intervals. In step 1003, occupancy indexes are then assigned new associations with the updated traffic records according to the new timestamps.

In one aspect of the invention, business rules may be specified in terms of, for example, standard length of railcars, or fluidity factors. For example, a sensitivity analysis of target railcar lengths may be performed, which in turn, would allow rail terminals to estimate the physical space needs of the terminal. More specifically, a rail terminal may vary the projected railcar lengths to study the impact of different sized railcars on overall terminal spatial requirements. As another example, terminals may perform a sensitivity analysis of the fluidity factor, which is a scaling factor that reflects additional capacity required to ensure fluidity of operations at most times, and varies according to the specific type or types of traffic handled by a given terminal. Thus, rail terminals may analyze how target fluidity operations impact dwell times.

In one aspect of the invention, traffic data at subcomponents within the rail terminal may be modeled. For example, rail terminals may model the dwell times of every subcomponent of a hump yard, such as a receiving yard, classification bowl and forwarding yard. Each core hump yard component performs a specific function. Receiving yards are designed to support the arrival and staging of inbound trains. Classification bowls primarily support the processing of inbound traffic into homogeneous outbound blocks (groups of cars with the same outbound classification). Forwarding yards support the building, staging and forwarding of outbound trains. In this way, rail terminals may track terminal capacity demand separately at each hump yard subcomponent (i.e., receiving yard, classification bowl and forwarding yard). For capacity to be tracked separately for the receiving yard, classification bowl and forwarding yard, the overall terminal arrival to terminal departure dwell may be subdivided into 3 discrete time intervals, namely a receiving yard dwell, a bowl dwell and a forwarding yard dwell. The steps for tracking capacity in a hump yard are illustrated in steps 300-313 in FIG. 3. The steps in FIG. 3 illustrate discretizing traffic records and assigning occupancy definitions in the same manner as illustrated in FIG. 1, with the exception that FIG. 3 has additional step 303.

Figure 3:
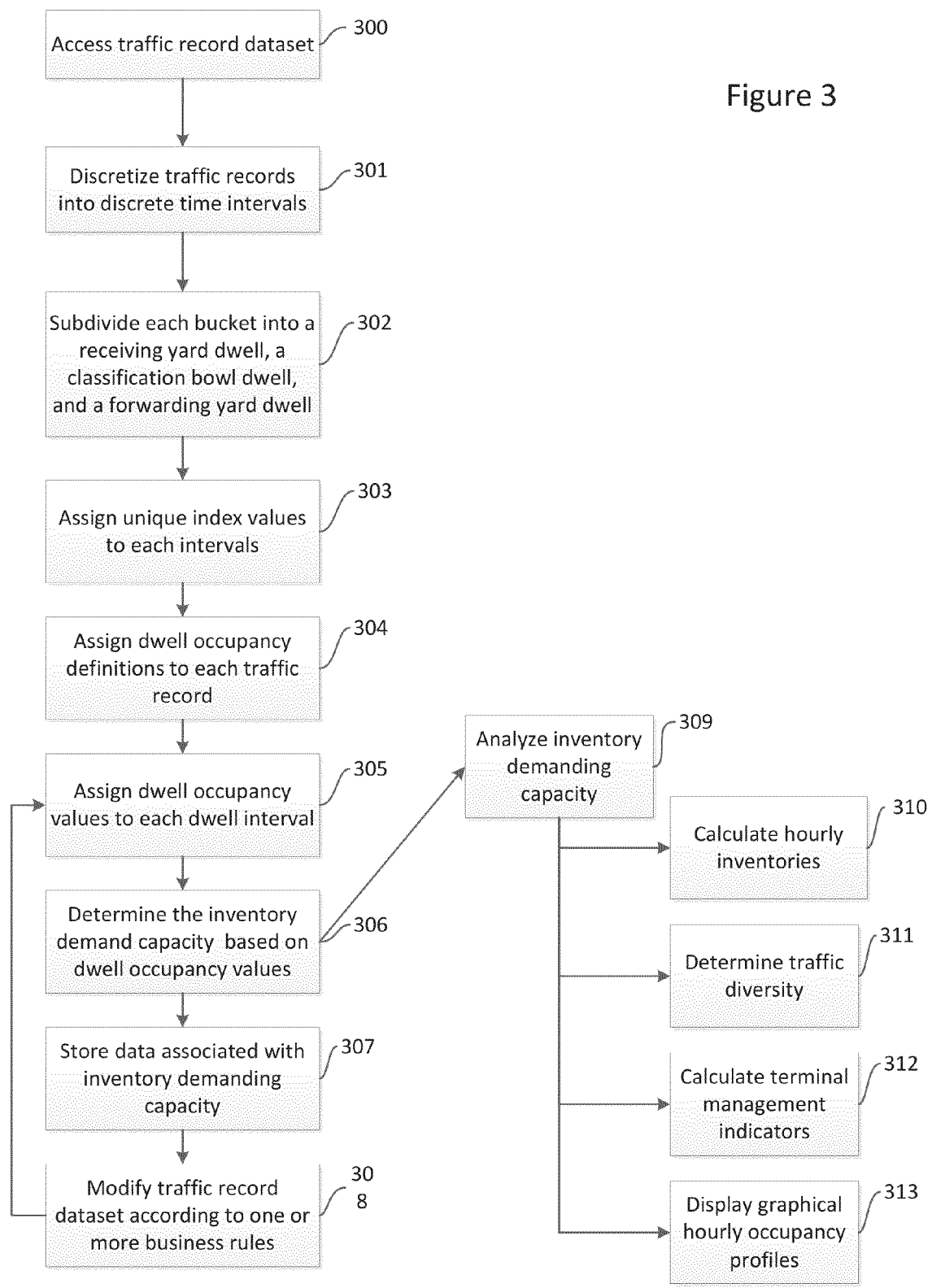
FIG. 3 is a diagram of an exemplary method sub-indexing terminal traffic records by terminal subcomponents, such as a receiving yard, classification bowl or forwarding yard, according to one embodiment the present invention.
Figure 4:
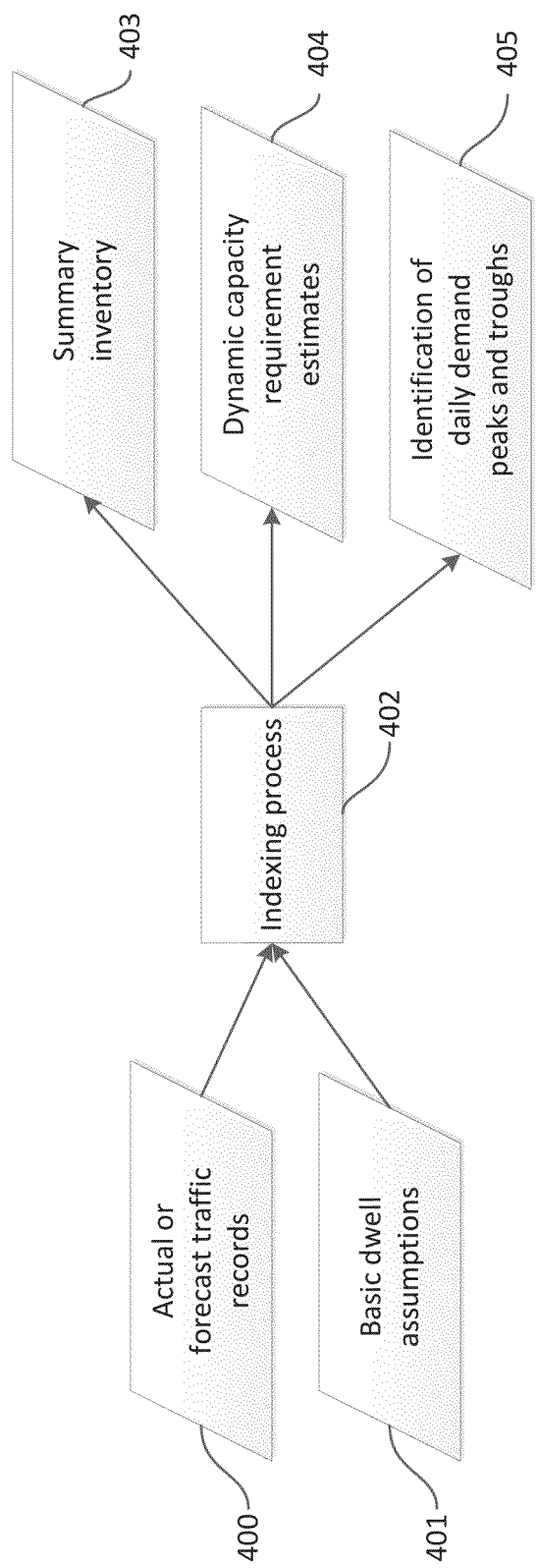
FIG. 4 is a diagram depicting the inputs and outputs of the indexing process according to one embodiment of the present invention.

Referring to step 303 in FIG. 3, hump yards may be divided into their subcomponents (e.g., receiving yard, classification bowl and forwarding yard). Once hump yards are divided into their subcomponents, the subcomponents may then be indexed, and assigned to occupancy index dwells. The subdivisions of a hump yard may be indexed using terminal arrival and departure times, and projected subcomponent dwell values, i.e., dwell "assumptions." Dwell assumptions are target and/or forecasted dwell times, rather than historical, backward-looking dwell times based on previous measurements made in the past. For example, a hump yard may be subdivided into three components: a receiving yard, a classification bowl, and a forwarding yard. The arrival and departure times for each subcomponent are calculated using the terminal arrival and departure times, and the dwell assumptions for the receiving and forwarding yards. In particular, the first component, the receiving yard component, is defined from the terminal arrival time ("AT") to a receiving yard end time ("ETA"). The ETA is calculated by adding the target or projected receiving yard dwell time, i.e., dwell assumption, to the terminal arrival time. For example, if the terminal AT is 2:00 pm, and the receiving yard dwell assumption is 30 minutes, then the ETA is calculated to be 2:30 pm. The arrival and departure times for the receiving yard subcomponent are calculated in the same manner. The dwell for the forwarding yard is calculated using the terminal departure time ("DT"), and a forwarding yard dwell assumption. The forwarding yard dwell assumption is then subtracted from the DT, to yield the forwarding yard arrival time ("FTA"). The dwell for the classification bowl subcomponent is then the time interval between the receiving yard departure time and the forwarding yard arrival time, where the ETA is used as the arrival time for the classification bowl ("BTB"), and the FTA is used as the classification bowl end time ("ETB").

The use of a computer processor to iteratively apply business rules allows rail terminals to perform sensitivity analyses quickly and efficiently. For example, the use of a computer processor makes it possible for rail terminals to quickly and efficiently perform a sensitivity analysis that performs numerous iterations and processes large amounts of traffic data, that would otherwise be too time and labor intensive to perform manually.

Figure 11:
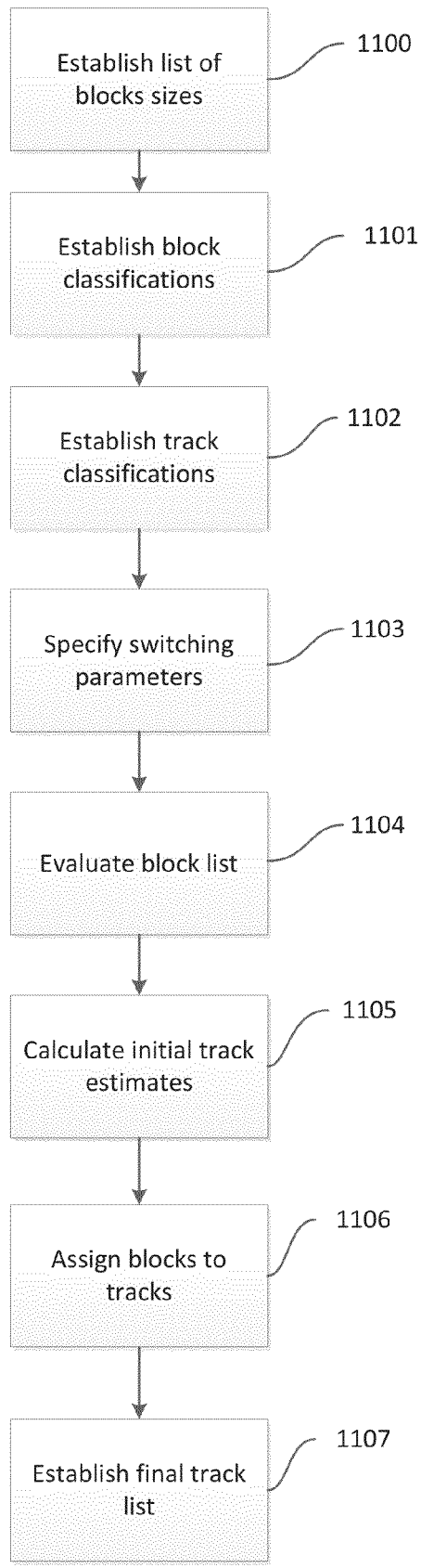
FIG. 11 is a diagram of the method of assigning railcar blocks to terminal tracks to determine terminal track number and size needs, according to one embodiment of the present invention.

Whereas FIGS. 1-10 illustrate the analysis of railcar capacity demand and overall rail terminal size requirements, FIG. 11 illustrates how railcars are allocated across tracks, so rail terminals may accurately determine the number and size of tracks needed to accommodate groups of railcars traveling to the same destination. That is, by modeling how railcars are assigned to rail terminal tracks, the rail terminal may accurately determine the size and number of tracks needed to accommodate the staging of railcars at a rail terminal. Steps 1100-107 in FIG. 11 illustrate the process of creating a list of tracks and railcars assigned to each track. This list of tracks represents the minimum number of tracks needed to stage every block arriving at a rail terminal. Using other parameters, such as the car footage per railcar, the total amount of physical space needed to accommodate every track may be determined. Significantly, by using the occupancy indexing process described in FIGS. 1-10, a rail terminal may create this track list without performing detailed simulations that require virtual representations of tracks. In this way, the rail terminal may determine the number and size of tracks needed to accommodate groups of railcars in a timely and efficient manner, consuming as few resources as possible. Micro-simulation tools, in contrast, do not determine the number or size of tracks needed to meet a terminal's capacity demand; micro-simulation tools typically require creating a virtual terminal, reiteratively changing the number or size of tracks, and performing a full simulation of the traffic flow with each iteration. As noted above, creating a virtual terminal and performing a simulation can consume a significant amount of time and resources, generally on the order of several days. Thus, micro-simulation tools are not well-suited for making strategic planning decisions in a timely and efficient manner.

Referring to step 1100 in FIG. 11, a list of block sizes is established at a rail terminal. Railcar blocks are groups of cars that are forwarded to the same successive handling point, and switched together with other cars also destined to the said handling point. A given train may carry one or more blocks (typically at least 2 to 3). In step 1100, a list of the sizes, in terms of number of railcars, of each block identified at a rail terminal is created. According to one embodiment of the invention, this information is based on the traffic record dataset and occupancy indexes discussed with reference to FIGS. 1-10. For example, an accurate list of railcar blocks and their sizes may be generated for any given hour, by cross-tabulating the occupancy indexes depicted in FIGS. 6 and 7. As noted above, there are no methodologies to date that allow rail terminals to model terminal traffic data on small periodic time intervals, such as hourly time periods. Moreover, the list of railcar blocks and their sizes generated according to step 1100 does not require resource intensive micro-simulation tools, allowing rail terminals to generate these lists in a timely and efficient manner.

Referring to step 1101, after identifying the departing sizes of railcar blocks, a list of block classifications is established based on these block sizes. For example, the list of block classifications may include jumbo, large, and small blocks. Jumbo blocks may be classified as railcar blocks for which the number of railcars exceeds the maximum number of railcars that can be staged in a single track, such that the entire jumbo block will be distributed across multiple tracks. The maximum number of cars that can be staged in a single track may be a limit specified as a switching parameter, discussed in more detail in step 1103 below. Large blocks may be classified as blocks for which the number of railcars does not exceed the maximum number of cars that can be staged in a single track, but is large enough to warrant assignment to a track dedicated to that block. Small blocks are blocks for which the number of railcars is low enough to warrant assignment of that block to tracks designed to hold multiple small blocks. Terminals do not typically categorize blocks, let alone categorize blocks in this manner.

Referring to step 1102 a list of track classifications may then be created. For example, the list of track classifications may include jumbo tracks, overflow tracks, regular tracks and small tracks. Jumbo block tracks and regular block tracks are designed to stage a single homogeneous block. There may be more than one jumbo block track assigned to any given single jumbo block. In other words, a single jumbo block may be assigned to two jumbo block tracks because the block is too large for a single track. Overflow tracks are tracks designed for the staging of overflow jumbo block traffic, the volume for which warrants assignment to a another track. Regular tracks are designed to hold large blocks. Small block tracks are tracks designed to hold multiple small blocks.

Referring to step 1103, switching parameters, i.e., railcar handling parameters, are defined for assigning blocks to tracks. Switching parameters, similarly to business rules, allow rail terminals to perform sensitivity analyses to determine an optimal number of classification tracks and track lengths required to meet the rail terminal's capacity needs. These parameters may include without limitation: volume threshold for large blocks; volume threshold for small blocks; a maximum number of cars to be held in a small block track; a maximum number of blocks to be held in a small block track; threshold for jumbo block overflow traffic; car footage; and a minimum classification track footage. The volume threshold for large blocks parameter specifies the maximum number of cars that may be held in a single classification track. Blocks with an average departing size exceeding such thresholds will be defined as "jumbo" blocks. The volume threshold for small blocks parameter determines which non jumbo blocks are small enough to be assigned to small block tracks. The maximum number of blocks to be held in a small block track limits the handling intensity associated with small block tracks. The maximum number of blocks to be held in a small block track limits the handling intensity associated with small block tracks. The threshold for jumbo block overflow traffic governs whether overflow traffic for a jumbo block is assigned to a dedicated track allocated for staging jumbo block "spill-over" traffic. The car footage parameter specifies the length, in feet, of each car. This parameter may be used to convert track requirements from car counts into track footages, as described in more detail below. The minimum classification track footage may be used to specify a reasonable minimum track length.

Changes to the above listed parameters will, for a given list of blocks and associated block sizes, result in variations in the minimum number of classification tracks and track sizes needed. For example, a reduction in the volume threshold for large blocks would likely cause more blocks to be defined as "jumbo" blocks, which in turn, would cause more blocks to be distributed across multiple tracks, and therefore, raise the minimum number of tracks required to stage the railcar blocks. Accordingly, the specification parameters allow rail terminals to perform sensitivity analyses and optimize the minimum number of tracks and track sizes required to stage railcars at a rail terminal. Significantly, these sensitivity analyses do not require micro-simulation tools that typically involve resource-intensive virtual representations of terminals and tracks to perform a simulation. In this way, rail terminals may analyze the impact of various different switching parameters on rail terminal capacity needs in a timely and efficient manner.

Referring to step 1104, the block list generated in step 1102 is evaluated against the switching parameters defined from step 1103. First, the blocks identified in step 1100 are ranked in descending order by average departing volume. Each block is then assigned a block classification from the block classification list created in step 1101, based on the block's average departing volume and switching parameters defined in step 1103. For example, blocks for which average departing volume exceeds the maximum number of cars that can be staged in a single track (defined in the switching parameters above) are classified as jumbo blocks. Then, the block would be assigned to a jumbo track in accordance with step 1104.

Referring to step 1105, several values to determine the initial estimate of track requirements for jumbo blocks and large blocks are calculated. These values include the ratio of average departing volume to volume threshold for large blocks; the number of dedicated tracks to be fully occupied by each jumbo block (excluding overflow traffic); jumbo block overflow volume (i.e., volume that does not fully occupy a dedicated track); and relative contribution of each block to sum of average departing volumes across blocks.

Referring to step 1106, each block from the block list created in step 1104 is assigned to a track from the track list created in step 1102 in order of descending average departing volume. For example, jumbo blocks are first assigned to jumbo tracks. Overflow volume from jumbo blocks that cannot fit on a single dedicated track are assigned to overflow tracks, as described below. Next, large blocks are assigned to regular tracks; because the number of railcars in a large block will not exceed the maximum number of cars that can fit in a single track, there is no need to assign overflow volume from large blocks. After assigning large blocks, small blocks and overflow jumbo block volume too small for dedicated tracks are assigned to small tracks. By creating a list of tracks as discussed above in step 1102, and dynamically assigning blocks to these tracks, the present invention obviates the time-intensive task of creating a detailed virtual representation of terminal tracks based on real-world, existing terminal layouts.

In one aspect of the invention, the tracks may be labeled with prefixes designating their classification. For example, tracks fully occupied by jumbo blocks may be labeled with the prefix "JT". Similarly, tracks partially occupied by jumbo block overflow volume may be labeled with prefix "OT", tracks with large blocks may be labeled with the prefix "RT", and tracks for small blocks are labeled "ST".

Referring to step 1107, the block list and associated track assignment data is consolidated into a final track list. The final track list may include a list of blocks and their classifications. For example, the first track in the track list may be a jumbo track containing a jumbo block. The last track in the track list may be a small track, containing two small blocks and two cars of overflow volume from the jumbo block. Using the car footage parameter specified in step 1103, the amount of square footage needed to accommodate all the blocks in each track may be determined. For example, by multiplying the square footage parameter by the number of railcars in the jumbo block in the first track, a rail terminal may determine the total amount of footage required to accommodate the jumbo block. Thus, the final track list allows rail terminals to determine the minimum number of tracks and square footage required to satisfy a rail terminal's capacity needs at any given moment.

In another aspect of the invention, after the final track list has been created, track numbers may be assigned to the tracks in the track list. The numbering may be sequential, based on the order of departure size.

Generally, it should be noted that the processes and components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, applications, components, data structures, etc., that perform particular tasks or implement particular abstract data types.

Those skilled in the art will appreciate that the invention may be practiced with various computer system configurations, including hand-held wireless devices such as mobile phones, tablets or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Mobile computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as the Macintosh® OS or iOS operating systems, Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks. Such a set of instructions for performing a particular task may be characterized as a program, software program, software, engine, module, component, mechanism, or tool. The computer may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, RUM and/or JavaScript, for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or nonremovable memory interface.

The processing unit that executes commands and instructions may be a general purpose computer, but may utilize any of a wide variety of other technologies including a special purpose computer, a microcomputer, mini-computer, mainframe computer, programmed microprocessor, micro-controller, peripheral integrated circuit element, a CSIC (Visitor Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI, for example. For wireless communications, communications protocols may include Bluetooth, Zigbee, IrDa, Wi-Fi, 2G, 3G, Ultra-Wideband and Long Term Evolution (LTE) or other suitable protocols. The wireless communications protocol may also include short-range communications devices and protocols, such as RFID, or Near-Field Communication radio transmissions. Furthermore, components of the system may communicate through a combination of wired or wireless paths.

According to one particular embodiment, the terminal capacity analysis tool may be implemented with a mobile application (or "app") on a hand-held device, such as a tablet computer or smart phone device, which may be further coupled with sensory devices to help collect input data from the user and/or the rail terminal environment.

Although many other internal components of the computer are not shown, those of ordinary skill in the art will appreciate that such components and the interconnections are well known. Accordingly, additional details concerning the internal construction of the computer need not be disclosed in connection with the present invention.

The embodiments described above are given as illustrative examples only. It will be readily appreciated by those skilled in the art that many deviations may be made from the specific embodiments disclosed in this specification without departing from the invention. Accordingly, the scope of the invention is to be determined by the claims below rather than being limited to the specifically described embodiments above.

What is claimed is:

1. A computer-implemented method of determining capacity of a rail terminal, the method comprising:
   accessing a dataset comprising a plurality of train traffic records associated with a rail terminal, said dataset being stored in at least one database;
   indexing, by at least one computer processor, said plurality of train traffic records into periodic intervals;
   assigning, by the at least one computer processor, unique index values to each periodic interval;
   assigning, by the at least one computer processor, dwell occupancy definitions to each of said train traffic records, said dwell occupancy definitions comprising occupancy limits that a block of railcars have occupied the railway terminal;
   creating, by the at least one computer processor, occupancy indexes for each of said train traffic records based on said dwell occupancy definitions, thereby dividing each occupancy definition into occupancy intervals;
   assigning, by the at least one computer processor, dwell occupancy values to each occupancy index based on said dwell occupancy definitions and said dataset; and
   determining, by the at least one computer processor, a capacity demand of said rail terminal based on said dwell occupancy values.

2. The method of claim 1, further comprising creating said traffic record dataset, wherein said traffic record dataset is created by tracking arrival and departure times of railcars at the rail terminal where the railcars have the same outbound classification.

3. The method of claim 1, wherein said step of assigning dwell occupancy definitions comprises assigning a minimum value and a maximum value that define which periodic interval is associated with an arrival time.

4. The method of claim 1, wherein said step of assigning dwell occupancy definitions comprises assigning a minimum value and a maximum value that define which periodic interval is associated with a departure time.

5. The method of claim 1, further comprising modifying said traffic record dataset according to one or more business rules.

6. The method of claim 1, further comprising creating said traffic record dataset, wherein said traffic record dataset is created by tracking the arrival and departure times of each group of cars having the same outbound classification within said train terminal, wherein said rail terminal comprises at least one of a receiving yard, a classification bowl, or a forwarding yard.

7. The method of claim 6, further comprising subdividing each periodic interval into a receiving yard dwell, a classification bowl dwell, and a forwarding yard dwell, wherein the receiving yard dwell is defined based on an arrival time and a receiving yard dwell assumption, the classification bowl dwell is defined based on the receiving yard dwell assumption and a classification bowl dwell assumption, and the forwarding yard dwell is defined based on the classification bowl dwell assumption and a forwarding yard assumption.

8. The method of claim 1, further comprising the step of generating a graphical display of terminal capacity over a specified time interval.

9. The method of claim 1, further comprising determining the number of different outbound classifications present within a facility within a specified time interval.

10. The method of claim 1, further comprising the step of determining one or more parameters selected from the group consisting of: an average hourly railcar inventory, an average daily maximum hourly railcar inventory, a minimum hourly railcar inventory, a maximum hourly railcar inventory, and a range between the minimum hourly railcar inventory and the maximum hourly railcar inventory.

11. The method of claim 10, further comprising applying a fluidity factor to said one or more parameters.

12. The method of claim 1, wherein said step of determining the capacity of said rail terminal comprises cross-tabulating dwell occupancy values.

13. A system for determining hourly terminal capacity, the system comprising:
at least one database for storing a dataset comprising a plurality of train traffic records associated with a rail terminal; and
a processing engine;
wherein said processing engine executes instructions to perform the steps of:
accessing, by at least one computer processor, said train traffic record dataset associated with a rail terminal;
indexing, by the at least one computer processor, said plurality of train traffic records into periodic intervals;
assigning, by the at least one computer processor, unique index values to each periodic interval;
assigning, by the at least one computer processor, dwell occupancy definitions to each of said train traffic records, said dwell occupancy definitions comprising occupancy limits that a block of railcars have occupied the railway terminal;
creating, by the at least one computer processor, occupancy indexes for each of said train traffic records based on said dwell occupancy definitions, thereby dividing each occupancy definition into occupancy intervals;
assigning, by the at least one computer processor, dwell occupancy values to each occupancy index based on said dwell occupancy definitions and said dataset; and
determining, by the at least one computer processor, a capacity demand of said rail terminal based on said dwell occupancy values.

14. The system of claim 13, wherein said at least one database for storing the dataset comprises data tracking arrival and departure times of railcars at the rail terminal where the railcars have the same outbound classification.

15. The system of claim 13, wherein said step of assigning dwell occupancy definitions comprises assigning a minimum value and a maximum value that defines which periodic interval is associated with an arrival time.

16. The system of claim 13, wherein said step of assigning dwell occupancy definitions comprises assigning a minimum value and a maximum value that defines which periodic interval is associated with a departure time.

17. The system of claim 13, further comprising modifying traffic records according to one or more business rules.

18. The system of claim 13, further comprising creating said traffic record dataset, wherein said traffic record dataset is created by tracking the arrival and the departure times of each group of cars having the same outbound classification within said rail terminal, wherein said rail terminal comprises at least one of a receiving yard, a classification bowl, and a forwarding yard.

19. The system of claim 18, further comprising the step of subdividing each periodic interval into a receiving yard dwell, a classification bowl dwell, and a forwarding yard dwell, wherein
the receiving yard dwell is defined based on an arrival time and a receiving yard dwell assumption,
the classification bowl dwell is defined based on the receiving yard dwell assumption and a classification bowl dwell assumption, and
the forwarding yard dwell is defined based on the classification bowl dwell assumption and a forwarding yard assumption.

20. The system of claim 13, further comprising the step of generating a graphical display of terminal capacity over a specified time interval.

21. The system of claim 13, further comprising determining the number of different outbound classifications present within a facility within a specified time interval.

22. The system of claim 13, further comprising the step of determining parameters selected from the group consisting of: an average hourly railcar inventory, an average daily maximum hourly railcar inventory, a minimum hourly railcar inventory, a maximum hourly railcar inventory, and a range between the minimum hourly railcar inventory and the maximum hourly railcar inventory.

23. The system of claim 22 further comprising applying a fluidity factor to said one or more parameters.

24. The system of claim 13, wherein said step of determining the capacity of said rail terminal comprises cross-tabulating dwell occupancy values.

25. A computer-implemented method of estimating a number classification tracks required within a rail terminal having a plurality of tracks, the method comprising:
creating, by at least one computer processor, a list of railcar blocks;
establishing, by the at least one computer processor, a list of railcar block sizes based on said list of railcar blocks;
establishing, by the at least one computer processor, a list of railcar block classifications based on said list of railcar blocks;
establishing, by the at least one computer processor, a list of track classifications based on said list of railcar blocks and said plurality of tracks;
specifying, by the at least one computer processor, switch parameters;
evaluating, by the at least one computer processor, said list of railcar blocks based on said list of railcar block sizes and said list of railcar block classifications;
calculating, by the at least one computer processor, initial track estimates;
assigning, by the at least one computer processor, said list of railcar blocks to said plurality of tracks based on said list of railcar block classifications, said list of track classifications, and said switch parameters; and
generating, by the at least one computer processor, a list of tracks based on said step of assigning.

26. The method of claim 25, wherein said step of specifying switching parameters is based on business rules.

27. The method of claim 25, wherein said business rules specify the maximum number of cars that may be held in one classification track.

28. The method of claim 25, wherein said business rules determine whether a block maybe assigned to a track based on the size of said block and classification of said track.

29. The method of claim 25, wherein said business rules determine the maximum number of blocks to be held in one classification track.

30. The method of claim 25, wherein said business rules determine the amount of block traffic for assigning railcars to a dedicated track.

31. The method of claim 25, wherein said business rules determine the standard length of a railcar.

32. The method of claim 25, wherein said business rules determine a minimum track length.

33. The method of claim 25, wherein said step of assigning comprises assigning blocks to tracks based on block classification and track classification.

34. A system for assigning railcar blocks to a plurality of rail terminal tracks, the system comprising:
   a dataset engine that provides a list of railcar blocks;
   a classification engine that classifies said railcar blocks according and said plurality of rail terminal tracks;
   a switching parameter engine, said switching parameter engine specifying switching parameters and generating a list of classified blocks according to said switching parameters; and
   an assignment engine that assigns each block on said list of classified blocks to a classified track.

35. The system of claim 34, wherein said switching parameter engine comprises business rules.

36. The system of claim 35, wherein said business rules specify the maximum number of cars that may be held in one classification track.

37. The system of claim 35, wherein said business rules determine whether a block may be assigned to a track based on the size of the block and classification of the track.

38. The system of claim 35, wherein said business rules determine the maximum number of blocks that may be held in one classification track.

39. The system of claim 35, wherein said business rules determine the amount of block traffic for assigning railcars to a dedicated track.

40. The system of claim 35, wherein said business rules determine the standard length of a railcar.

41. The system of claim 35, wherein said business rules determine a minimum track length.

42. The system of claim 34, wherein said assignment engine assigns blocks to tracks based on block classification and track classification.

\* \* \* \* \*